UNITED STATES PATENT OFFICE.

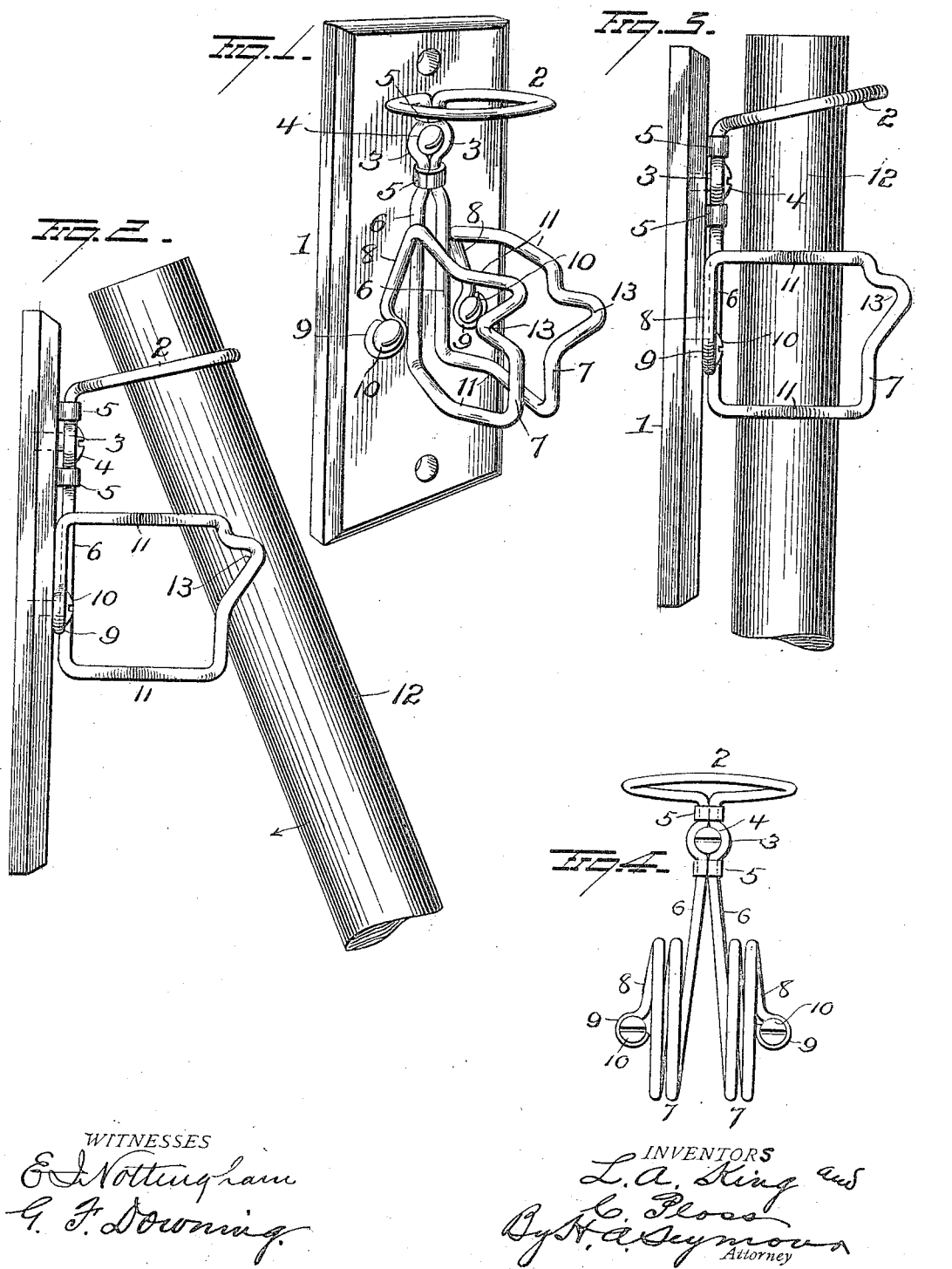

LOUIS A. KING AND CLARENCE PLOSS, OF SALEM, MASSACHUSETTS.

HOLDER.

No. 813,047.  Specification of Letters Patent.  Patented Feb. 20, 1906.

Application filed February 7, 1905. Serial No. 244,592.

*To all whom it may concern:*

Be it known that we, LOUIS A. KING and CLARENCE PLOSS, residents of Salem, in the county of Essex and State of Massachusetts, have invented certain new and useful Improvements in Holders; and we do hereby declare the following to be a full, clear, and exact description of the invention, such as will enable others skilled in the art to which it appertains to make and use the same.

Our invention relates to an improved holder particularly adapted for clamping and holding broom-handles, the handles of carpet-sweepers, and other articles having elongated handles, the object of the invention being to provide an improved holder in which the handle can be easily placed or removed and which will securely hold the same when in position therein.

With this object in view the invention consists in certain novel features of construction and combinations and arrangements of parts, as will be more fully hereinafter described, and pointed out in the claims.

In the accompanying drawings, Figure 1 is a perspective view illustrating our improvements. Figs. 2 and 3 are views in side elevation, illustrating the manner of inserting a handle; and Fig. 4 is a front view of a modification.

1 represents a block adapted to be secured to a wall or other support. Our improved holder comprises a single piece of spring-wire bent centrally between its ends, forming a loop 2 and which I shall hereinafter refer to as the "handle fulcrum-loop." This loop is located near one end of block 1, is inclined upwardly at an angle obtuse to the horizontal plane of the clamping-jaws, as shown, to permit the ready insertion of the handle 12 therein. and the ends of the wires at the base of the loop are bowed, forming an eye 3 to receive a screw 4, driven into block 1 and holding the loop 2 in proper position, the wires being connected at opposite sides of the eye 3 by metal straps 5 to prevent spreading of the wires at this point. The wire ends then extend along the block 1 and are approximately parallel, as shown at 6, and are each given an angular coil, forming single angular convolutions 7, as shown in Figs. 1, 2, and 3, or double convolutions 7, as shown in Fig. 4, or any number of convolutions, as may be desired, and we therefore do not restrict ourselves to any particular number of convolutions, but may have as many as may be found desirable to suit the trade. The ends of the wires are then flared, as shown at 8, and bent into eyes 9 at their extreme ends to receive screws 10 to secure them to the block 1.

The outwardly-projecting parallel members 11 of the angular convolutions 7 are bowed outward between their ends, forming a large clamping-surface for the handle 12 and preventing the spring-pressure tending to force the handle outward, as would be the case were the convolutions perfectly straight. The outer vertical members are bent between their ends, forming laterally-projecting tongues 13, providing a flared entrance to properly guide the handle into the clamp.

In operation the handle 12 is first inserted through loop 2, as shown in Fig. 2, and when inward pressure is applied to the lower portion of the handle the loop 2 will serve as a fulcrum and render easy the forcing of the handle into the clamp, as shown in Fig. 3. To remove the handle, the lower portion thereof is pulled outward until it is free from the clamp, and it is then withdrawn from loop 2.

By constructing our improvements as above explained the handle can be easily and quickly inserted in the clamp and be securely held therein. It requires but slight effort to insert and remove the handle and can be accomplished by a child as well as by a grown person. The device is extremely simple in construction, cheap to manufacture, and strong and durable in use.

A great many slight changes might be made in the general form and arrangement of the parts described without departing from our invention, and hence we do not restrict ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. A holder comprising a spring-wire clamp consisting of convolutions of the wire, the central portion of said wire bent forming a closed handle fulcrum-loop overhanging the convoluted clamp.

2. A holder comprising a single piece of spring-wire bent centrally between its ends forming a closed loop, the ends of said loop extended and forming depending arms, and the ends of the wire beyond said arms bent forming convolute clamping-jaws under the closed loop.

3. A holder comprising a piece of wire having its end portions bent forming convolute clamping-jaws, and having its central portion bent forming a closed fulcrum-loop over the clamping-jaws, said loop inclined upwardly at an obtuse angle to the horizontal plane of the clamping-jaws.

4. A holder, comprising a single spring-wire, bent between its ends forming a handle fulcrum-loop, and the ends bent forming angular clamping convolutions with bowed clamping members and flared entrance-guiding tongues at their outer ends.

5. A holder, comprising a block, a single spring-wire bent forming a spring-clamp secured to said block, and a fulcrum-loop above the clamp and secured to the block.

6. A holder, comprising a handle fulcrum-loop, and a spring-clamp below the same, each member of said clamp consisting of a plurality of convolutions and arms integral with said loop and clamp and connecting them.

7. In a holder, the combination with a block or support, of a wire bent centrally between its ends forming an outwardly-projecting loop, the wire below the loop projected downwardly and forming an eye under the loop, a fastening device passing through said eye and into the block or support, said wires depending from said eye and having their end portions bent forming convolute clamping-jaws, and fastening devices securing the extremities of the wire to the block or support.

In testimony whereof we have signed this specification in the presence of two subscribing witnesses.

LOUIS A. KING.
CLARENCE PLOSS.

Witnesses:
  WINFRED PLOSS,
  EBEN N. WALTON.